United States Patent
Breuer et al.

(10) Patent No.: US 10,524,115 B2
(45) Date of Patent: Dec. 31, 2019

(54) METHOD FOR OPERATING A WIRELESS DEVICE

(71) Applicant: GEMALTO M2M GmbH, Munich (DE)

(72) Inventors: Volker Breuer, Boetzow (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 0 days.

(21) Appl. No.: 15/761,618

(22) PCT Filed: Nov. 4, 2016

(86) PCT No.: PCT/EP2016/076651
§ 371 (c)(1),
(2) Date: Mar. 20, 2018

(87) PCT Pub. No.: WO2017/080918
PCT Pub. Date: May 18, 2017

(65) Prior Publication Data
US 2018/0352423 A1    Dec. 6, 2018

(30) Foreign Application Priority Data
Nov. 9, 2015 (EP) .................................. 15193582

(51) Int. Cl.
*H04W 8/24* (2009.01)
*H04W 48/20* (2009.01)
(Continued)

(52) U.S. Cl.
CPC ............ *H04W 8/24* (2013.01); *H04L 1/0003* (2013.01); *H04W 48/20* (2013.01); *H04W 60/04* (2013.01); *H04W 72/0413* (2013.01)

(58) Field of Classification Search
CPC .................. H04W 48/20; H04W 8/24
(Continued)

(56) References Cited

U.S. PATENT DOCUMENTS

2014/0269464 A1* 9/2014 Park ................ H04W 48/16
                                                              370/311
2015/0043445 A1    2/2015 Xiong et al.
(Continued)

FOREIGN PATENT DOCUMENTS

| EP | 2 903 195 A1 | 8/2015 |
|---|---|---|
| WO | WO 2015/116732 A1 | 8/2015 |
| WO | WO 2015/116870 A1 | 8/2015 |

OTHER PUBLICATIONS

International Search Report (PCT/ISA/210) dated Jan. 19, 2017, by the European Patent Office as the International Searching Authority for International Application No. PCT/EP2016/076651.
(Continued)

Primary Examiner — Angel T Brockman
(74) Attorney, Agent, or Firm — Buchanan Ingersoll & Rooney PC (57) ABSTRACT

The present invention relates to a method for operating a wireless device, said wireless device being adapted for communicating with a cellular network by means of a serving base node, being the one of a plurality of base nodes of the cellular network the wireless device is currently camping on, configured to support extended coverage mode, the method comprising for the wireless device the steps of: —determining an extended coverage support level, relating to the capability of the wireless device for operating in extended coverage mode, —receiving extended coverage maximum support level broadcasted by a plurality of base nodes, —selecting one of the plurality of base nodes for registration as serving base node, —providing upon regis-
(Continued)

tration with the selected base node its extended coverage support level towards the base node.

9 Claims, 3 Drawing Sheets

(51) Int. Cl.
    *H04L 1/00* (2006.01)
    *H04W 60/04* (2009.01)
    *H04W 72/04* (2009.01)

(58) Field of Classification Search
    USPC .......................................................... 370/329
    See application file for complete search history.

(56) References Cited

U.S. PATENT DOCUMENTS

2016/0353440 A1    12/2016    Lee et al.
2017/0181009 A1    6/2017    Wong et al.

OTHER PUBLICATIONS

Written Opinion (PCT/ISA/237) dated Jan. 19, 2017, by the European Patent Office as the International Searching Authority for International Application No. PCT/EP2016/076651.

ZTE, Further considerations on SIB and Paging for MTC enhancement, 3GPP TSG, RAN WG1 Meeting #80, R1-150145, Feb. 9-13, 2015, pp. 1-7, Athens, Greece. http://www.3gpp.org/ftp/Meetings_3GPP_SYNC/RAN1/Docs/.

Ericsson LM, Introduction of EC-EGPRS, Definitions and general feature description, Oct. 12-13, 2015, pp. 1-10, 3GPP TSG-GERAN Ad Hoc on EC-GSM and eDRX, GPE150064 (revision of GP-150052), Stockholm, Sweden. http://www.3gpp.org/ftp/Meetings_3GPP_SYNC/GERAN/Docs/.

3rd Generation Partnership Project, Technical Specification Group Radio Access Network, Study on provision of low-cost Machine-Type Communications (MTC) User Equipments (UEs) based on LTE (Release 12), Jun. 25, 2013, pp. 1-55, 3GPP TR 36.888 V12.0.0, Mobile Competence Centre, 650, Route Des Lucioles, F-06921 Sophia-Antipolis Cedex, France.

* cited by examiner

METHOD FOR OPERATING A WIRELESS DEVICE

FIELD OF THE INVENTION

The present invention relates to a method for operating a wireless device The invention also pertains to a wireless device using said method. The invention also relates to a base node using said method.

BACKGROUND OF THE INVENTION

In the field of wireless cellular communication recent developments of wireless cellular standards, in particular LTE-Cat1, are mainly designed for low-cost (LC) devices, in particular in the field of machine type communication (MTC). Those devices are often situated in areas with bad reception conditions, e.g. metering devices in cellars.

As part of the 3GPP Release 13 definition for such LC devices it was suggested the so-called enhanced coverage (EC) mode. This solves said reception issues by allowing communication that way that by many repetitive receptions of the same data packets the receiver aggregates sufficient power gain until the data packets can be reliably read from the receiver. As a precondition the wireless device and the serving base node need to agree upon registration of the wireless device at the base node that on both sides of the air interface the enhanced coverage mode is activated. A precondition for that is that the base node supports EC devices, otherwise they were barred on that base node. The enhanced coverage support is performed up to a certain coverage enhancement limit which is also indicated by the base node, i.e. corresponding to the maximum of repetitions and resources a base node would spend for a user to achieve a certain coverage enhancement depth.

As many of such low-cost devices nowadays are operating in older wireless technology standards, in particular 2G, which encompasses the standards GSM, GPRS or EDGE, it is also discussed the option of introducing such enhanced coverage methods also in 2G. As the hardware requirements are low, it is likely that both wireless devices and the respective base nodes need only updates of the firmware for supporting enhanced coverage.

In the following enhanced coverage support which is related to a wireless technology standard other than LTE is called extended coverage mode. Main difference is here that for GSM extended coverage may to some extend be realized on existing hardware, i.e. just via a software update.

The concept of extended coverage for GSM is in particular defined in 3GPP TSG GERAN for GSM as Extended Coverage GSM (EC-GSM) as described for example in TD GPE150064 "CR 43.064-0090 Introduction of EC-EGPRS, Definitions and general feature description (Rel-13)" (Ericsson), which is incorporated herein by reference.

It is however a problem that depending on the capabilities of the wireless device, in particular its hardware equipment, not all wireless devices are capable to fully support extended coverage mode. The obvious solution only to allow extended coverage mode for those wireless devices which are fully capable of supporting this mode would leave out too much devices, in particular those who are capable to a certain extent of supporting extended coverage.

This applies in particular to those devices which are capable of supporting a certain amount of repetitions. This is in particular limited due to memory restrictions for averaging received signals and the phase stability of the used amplifiers depending on phase shifts in the uplink.

Here is where the invention is coming in, which allows also to support extended coverage mode for those devices, which are not capable of fully supporting the extended coverage mode, and hence to spread out this mode in particular to devices with cheaper hardware fitments.

It is therefore the goal of present invention to propose an improved solution for an operation of wireless devices in extended coverage mode.

Further alternative and advantageous solutions would, accordingly, be desirable in the art.

SUMMARY OF THE INVENTION

For this it is according to a first aspect of the invention suggested a method for operating a wireless device according to claim 1. It is further suggested according to a second aspect of the invention a wireless device according to claim 6. It is further suggested a base node according to claim 11. Further it is proposed a cellular network according to claim 14.

According to the first aspect of the invention it is proposed a method for operating a wireless device, said wireless device being adapted for communicating with a cellular network by means of a serving base node, being the one of a plurality of base nodes of the cellular network the wireless device is currently camping on, configured to support extended coverage mode, the method comprising for the wireless device the steps of:

determining an extended coverage support level, relating to the capability of the wireless device for operating in extended coverage mode, receiving extended coverage maximum support level broadcasted by a plurality of base nodes, selecting one of the plurality of base nodes for registration as serving base node, providing upon registration with the selected base node its extended coverage support level towards the base node.

The inventive method relates to a wireless device operating in a cellular network, in particular operating under a 2G standard, like Global System for Mobile communications (GSM), or derivations thereof, like GPRS, EDGE. Such cellular network comprises a plurality of base nodes that are the end points of the connection over the air interface with the wireless device. Furthermore the cellular network typically comprises more components in the so called radio access network (RAN) and/or the core network (CN), like a Home Location Register (HLR), an SGSN, a GGSN.

The wireless device and the cellular network resp. at least one of its base nodes are supposed to support extended coverage mode.

The general concept is however also applicable to 3G cellular networks (like UMTS, HSDPA), therefore this invention is generally technology standard agnostic, that is it depends upon the general decision of the responsible standardization body to introduce the concept of enhanced resp. extended coverage to the respective technology standard.

A wireless device according to the inventive method is adapted to have assigned resp. determine an extended coverage support level. With this extended coverage support level it is defined to what extend the wireless device is capable of operating within extended coverage with a base node, in particular the serving base node. The serving base node is the base node the wireless device is currently camping on.

The extended coverage support level is introduced as a measure which is supposed to be provided to the base node and indicates the capabilities of the wireless device in terms of extended coverage mode. The extended coverage support level is preferably defined by ranges of repetitions resp. decodable dB. Alternatively the maximum number of decodable repetitions resp. the resulting enhancement in dB is directly reflected as extended coverage support level. It is also foreseen to assign this extended coverage support level upfront, wherein the determination during runtime consist in requesting this extended coverage support level.

When the wireless device is about to figure out on which base node of a cellular network it is about to camp—e.g. when in either non-registered state or in case of a check for reselection—then the inventive method starts with receiving broadcasts of a plurality of base nodes. Hence at least two base nodes are capable of broadcasting, e.g. as part of system information blocks (SIB), in particular EC-SIBs or M-SIBs, an extended coverage maximum support level of the base node.

That extended coverage maximum support level gives an indication of the capabilities of the base node for supporting extended coverage.

First with that extended coverage maximum support level the wireless device gets informed if the base node is able to support extended coverage at all.

The inventive method is applicable for wireless devices capable of operating both in extended coverage and normal coverage.

Further the system information blocks are broadcasted in endless repetitions unless a system information changes, the wireless device will in any case be able to decode this broadcast. Hence, even if the wireless device is operating in bad coverage area, the broadcast from the base node will be retrieved at the wireless device as long as the base node is suitable for camping on it. Additionally, if the base node supports extended coverage mode, the wireless device gets informed with the broadcasted extended coverage maximum support level about the possible number of repetitions or—alternatively—the amount of power gain in dB which is achieved by the possible number of repetitions. Both values are directly related to each other, hence it is foreseen to broadcast one of both. Also the assignment to an extended coverage support level, which moreover might take into account other parameter is foreseen with this method step.

When the wireless device decoded the system information blocks (SIB) from all base nodes in the proximity, then the wireless device is in the position to decide for a base node.

Generally the decision for a base node is taking into account suitability criteria. In effect the base node which signals received with best signal quality is favored.

According to a preferred embodiment of the invention it is proposed that the step of selecting the serving base node from said plurality of base nodes bases on the match between extended coverage support level of the wireless device and extended coverage maximum support level of the base node.

This means that as at least one parameter considered for taking the decision, the wireless device determines the match between the extended coverage support level of the wireless device and the extended coverage maximum support level of each base node for which the broadcast was received.

The best match is in particular achieved, when it comes to supported repetitions, if the difference between repetitions indicated by the extended coverage maximum support level of the base node and the repetitions of the extended coverage support level of the base node, is lower than for any other base node.

With the selection of the appropriate base node, the wireless device attempts to camp on the base node, and—upon registration—provides the base node with the extended coverage support level. The provision of said information preferably is carried out as part of the UE capabilities transmission.

This is in particular done during the extended coverage capability signaling (for 2G networks EC-GSM capabilities) from the wireless device, which is foreseen as part of the general operation for registration on a base node.

With that the base node knows to which extent the wireless device is capable of decoding extended coverage signals and would be able to restrict itself in the following communication should the base node be capable of supporting a higher extended coverage support level than the wireless device can handle.

With the inventive method it is achieved the situation that even if the wireless device only to a certain extent supports the extended coverage mode, it may still be served by a base node even with higher capabilities of supporting extended coverage. In order not to waste resources the selection of a base node by considering the extended coverage maximum support level in comparison to the extended coverage support level of the wireless device helps getting here a good match.

According to a preferred embodiment it is proposed a method comprising the steps for the cellular network of deriving from information received from the wireless device relating to an extended coverage support level a uplink transport coding scheme of the wireless device, transmitting said uplink transport coding scheme to the wireless device, further comprising the step for the wireless device, upon reception of the uplink transport coding scheme from the serving base node, of transmitting signals in extended coverage to the base node by using the received uplink transport coding scheme.

Such uplink transport coding scheme relates to the kind how data are coded for uplink transmission.

For cellular networks supporting GSM resp. 2G technology standard the transport coding scheme is the so-called modulation coding scheme (MCS) In GSM classes MCS-1 to 9 are used for depicting the number of transport symbols per frame and the MCS class gives the ratio between payload and coding.

In 3G and later technology standard the transport coding scheme is the so-called transport block size. This size depicts how much bits are transferred in one transport block (see 3GPP TS36.213).

Based on the extended coverage support level provided by the wireless device, the base node or another component of the cellular network has the capability to define the applicable uplink transport coding scheme.

The transport symbols and used coding scheme is in particular dependent upon the data rate and channel type e.g. is it a voice (coding scheme CS) or a data traffic (MCS). The data rate is in particular dependent upon the extended coverage coding, in particular the amount of repetitions. It is known that usage extended coverage leads to materially lower data rates than normal coverage signaling. This is reflected by the transport coding scheme.

More parameters can in particular taken into account for defining the uplink transport coding scheme.

Consequently the wireless device uses the received uplink transport coding scheme for the following signalling.

Preferably this step of the preferred embodiment of the invention is carried out directly in conjunction with the registration procedure of the wireless device at a base node of the cellular network. With that it is assured that for following data exchange sessions an appropriate uplink transport coding scheme is selected and hence a reliable data connection is achieved.

Further it is proposed a method wherein the extended coverage support level for the uplink of the wireless device may differ from the extended coverage support level for the downlink, and wherein the step of providing the extended coverage support level comprises providing the extended coverage support level of the downlink to the serving base node.

This concept is based on the fact that the extended coverage support level for the uplink and the downlink may differ. That means in particular that for uplink signaling the wireless device might not be able to provide as much repetitions as it is capable of receiving in the downlink. It is even possible, that in the downlink the wireless device is capable to support full extended coverage, while it is limited in the uplink.

This situation is taken into account with different extended coverage support levels for the uplink and for the downlink.

Hence, during the step of providing the extended coverage support level to the base node, in particular in conjunction with the registration process, it is the extended coverage support level of the downlink which is provided.

This is advantageous as the base node can adapt its signaling behaviour for dedicated downlink transmissions according to the provided extended coverage support level for the downlink.

It is further proposed in another preferred embodiment a method further comprising the step for the wireless device of
receiving from the base node a set of uplink transport coding schemes,
determining the current extended coverage support level for the uplink further based upon conditions local to the wireless device,
determining at least one uplink transport coding scheme from said received set in dependence of the extended coverage support level for the uplink,
transmitting signals in extended coverage to the base node by using said determined uplink transport coding scheme.

Under the assumption that the extended coverage support level for the uplink and downlink may differ, this embodiment solves the issue about what uplink transport coding scheme is applicable for the extended coverage support level for the uplink, while the base node only has information relating to the extended coverage support level of the downlink.

For that it is proposed that the wireless device receives from the base node a set of uplink transport coding schemes for uplink signaling. This is in particular carried out in the broadcast or in response to the wireless device camping on the base node. In particular after the wireless device provided the extended coverage support level for the downlink, the base node has a sufficient indication in order to derive which uplink transport coding scheme might by applicable for the uplink transmissions.

When the wireless device received the uplink transport coding schemes, it has the task to select one of it.

Preferably first the set of uplink transport coding schemes is reduced. This is in particular carried out by blocking those uplink transport coding schemes which are not able to be supported by the wireless device.

Further the wireless device determines the extended coverage support level for the uplink.

This is done based upon conditions local to the wireless device. In particular such conditions local to the wireless device comprise at least one out of:
current extended coverage conditions,
uplink signaling capabilities of the wireless device.

Based on the extended coverage support level for the uplink the best matching uplink transport coding scheme is selected. Hence the next uplink signaling is done by using the selected uplink transport coding scheme.

Out of the used uplink transport coding scheme the receiving base node can determine which of the provided set of uplink transport coding scheme was selected. Thus it has further an indication with respect to the extended coverage support level for the uplink of the respective wireless device.

According to a second aspect of the invention it is proposed a wireless device adapted for communicating with a cellular network by means of a serving base node, being one of a plurality of base nodes the wireless device is currently camping on, the wireless device and the serving base node being configured to operate in extended coverage mode, wherein the wireless device is further adapted
to determine an extended coverage support level, relating to the capability of the wireless device for operating in extended coverage mode,
to receive extended coverage maximum support level broadcasted by a plurality of base nodes,
to select one of said plurality of base nodes for registration, and
to provide upon registration with the selected base node its extended coverage support level to the base node.

The second aspect of the invention shares the advantages of the first aspect. In an in particular advantageous embodiment of this aspect of the invention it is suggested a wireless device further comprising a subscriber identity unit wherein the subscriber identity unit is configured to store the extended coverage support level of the wireless device, and the wireless device is configured to determine the extended coverage support level by receiving from the subscriber identity unit on request the stored extended coverage support level.

The subscriber identity unit is in particular a SIM card or UICC, which is provided by the network operator and has stored relevant data for the subscription of the wireless device for operating in the cellular network.

With this embodiment it is foreseen that the wireless device is adapted for determining the extended coverage support level to receive an indication about the maximum supported extended coverage support level from the subscriber identity unit.

As the subscriber identity unit is provided by the network operator, this solution opens the possibility to provide a limitation to the wireless device. This limitation can have contractual nature, e.g. when the wireless device is a metering device with low data transmission rates, it preferably has a cheap tariff. With such limitations the network operator is able to assure through the subscriber identity unit that the respective wireless device does not use the cellular network in other ways as agreed.

Part of this limitation is according to this embodiment the extended coverage support level. As the repetitive transmission or reception on the side of the base node requires some resources, it is advantageous for the cellular network, if this is limited at least for some low-cost devices with such tariffs in order to have resources available for other tasks.

Hence the wireless device uses the extended coverage support level received from the subscriber identity unit.

However should the wireless device not be able to support the received extended coverage support level, then it would use an extended coverage support level with lower needs in particular indicating a lower amount of repetition for receiving a data transmission in extended coverage.

According to a third aspect of the invention it is proposed a base node of a cellular network, the base node being adapted for operating with at least one wireless device in extended coverage mode, wherein the base node is further adapted to:

broadcast an extended coverage maximum support level to at least one wireless device, receive upon a registration request from said wireless device the extended coverage support level of the wireless device.

This aspect relates to a base node of the cellular network, which is configured to operate with a wireless device according to the second aspect of the invention. This base node is in particular supporting the GSM technology standard, hence it is a base station (BS). Alternatively it could be a base node supporting 3G technology standard, hence it is a nodeB.

This aspect shares the advantages of the first and second aspect of the invention.

It is further proposed according to an advantageous embodiment of the third aspect a base node further adapted to determine, in response to receiving the extended coverage support level for the downlink from the registered wireless device, the maximum paging repetition level according to the extended coverage support level for the downlink indicated by the wireless device. According to this invention the base node takes into account the extended coverage support level for the downlink received from the registered wireless device. With this information the base node has an indication to what extend the wireless device is able to decode in extended coverage signals transmitted in the downlink.

Hence, according to this embodiment the base node adjusts its extended coverage support—at least for dedicated channels to the wireless device—to that extent that the signals are decodable for the receiving wireless device, although the extended coverage maximum support level of the base node would allow more. This in particular means that the number of repetitions is limited to the extended coverage support level for the downlink of the camping wireless device.

This in particular means for paging of a wireless device through a base node, where the wireless device was at least recently camping on, that the paging signals is repeated up to a certain amount.

For doing so the base node starts with the number of repetitions which has been sufficient in the recent attempts for reaching the device. If this fails i.e. a number of repetitions which should be sufficient was sent and no answer received a new series using that same value will be used. If all series as defined failed, the cellular network will go to the next extended coverage level and re-start the whole procedure with an increased number of repetitions as the wireless device propagation conditions may have become worse and it is now in a higher extended coverage level. It is stopped so far, when the base node reaches its extended coverage maximum support level i.e. for a 15 dB coverage enhancement up to that maximum support level.

Normally the paging would be carried out in 0, 5, 10 and 15 dB in that order. When the base node knows that the extended coverage support level of the wireless device indicates only a capability of 10 dBs, then after transmitting in 10 dB, no further try is carried out. This means an accumulation gain of 10 dB is the maximum for the wireless device and further repetitions can no more correctly be accumulated to increase further the extended coverage gain above 10 dB. This is beneficial as with increasing accumulation gain the number of repetitions that needs to be transmitted increases drastically. Consequently the base node is configured to react and not increase beyond what the wireless device supports.

In another preferred embodiment of the third aspect it is proposed a base node further configured to forward the received extended coverage support level to a transport coding scheme component within the cellular network, upon receiving the derived from the forwarded extended coverage support level from the transport coding scheme component, transmit said uplink transport coding scheme to said wireless device.

With this embodiment the workload of handling wireless devices in extended coverage mode is intended to be taken away from the base node, and distributed within the cellular network. For that a transport coding scheme component in the cellular network, in particular the RAN or the Core network (CN) is foreseen. The transport coding scheme component is in particular part of a known component of the cellular network. In such embodiments the transport coding scheme component is a software application or module running in the respective component of the cellular network.

This embodiment is advantageous as the base node only has to pass-through the extended coverage support level received from the wireless device in the one direction, and the uplink transport coding scheme to the wireless device in the other direction.

According to the fourth aspect of the invention it is proposed a cellular network comprising at least one network component and a plurality of base nodes, at least one of the base nodes being configured to operate with a wireless device in extended coverage mode, the network component comprising means to store an extended coverage support level received from a wireless device operating with a base node of the cellular network, the network component and the base nodes being configured to exchange information relating to extended coverage support level of at least one wireless device.

This aspect shares the advantages of the third aspect of the invention. In particular here is foreseen the distribution of tasks within the cellular network and a relief of the base node of additional tasks. As the network component, in particular the transport coding scheme component, and the base nodes are configured to exchange information relating the extended coverage support level.

In another advantageous embodiment it is also feasible that in the home location register (HLR) of the cellular network already information related to extended coverage support level of the wireless device is stored. With that, the base node can be instructed to serve the wireless device only in the range of the stored extended coverage support level.

As it is shown this invention and the aspects and embodiments of the inventions advantageously solves the depicted problem and propose a solution that allows also wireless devices with limited capabilities to operate in extended coverage within a cellular network.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
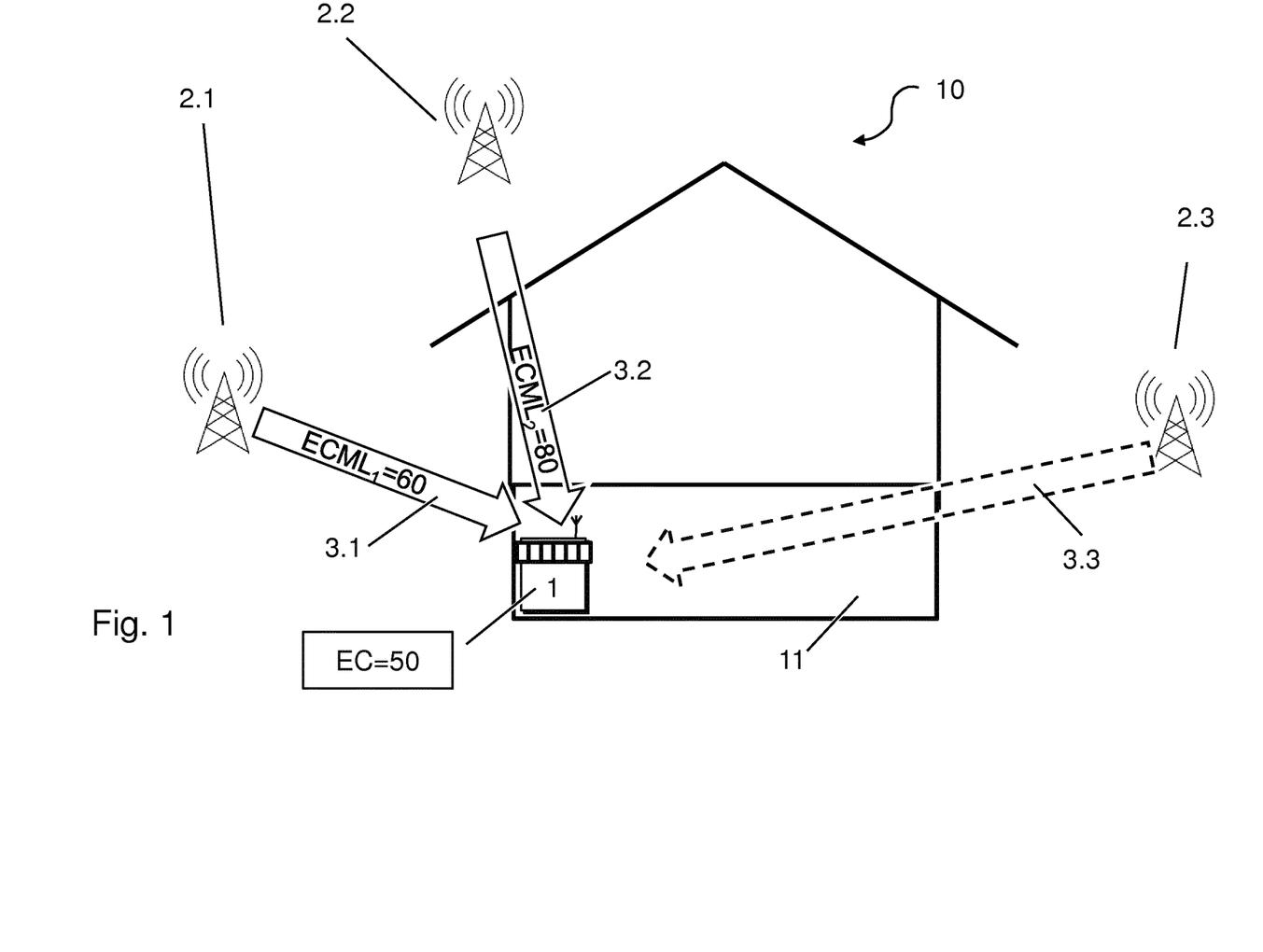
FIG. 1 represents the situation of a wireless communication device according to the prior art, for that the invention is designed.

FIG. 1 schematically shows a wireless device 1 of the type to which the present invention is applied to as an embodiment in the situation where the invention would typically show the most advantageous effect. As such the wireless device 1 is in particular an electricity metering device located in the basement 11 of a building 10. Other devices located in areas with impacted air interface would also take advantage of the invention, like a vending machine in a parking garage, an eHealth monitoring device in a shielded hospital area, control devices of wind or photovoltaic installations in a remote area etc.

The wireless device is in particular capable of operating in 2G cellular networks like GSM, GPRS or EDGE. Typically it is equipped with only low power, memory and/or processing capabilities and further is expected to consume only a low amount of power for operation.

In the shown exemplary embodiment the wireless device 1 is able to retrieve signals from three base nodes 2.1, 2.2, 2.3 of a cellular network. Base nodes 2.1 and 2.2 are able to be operated in extended coverage mode. Base node 2.3 operates in normal coverage mode and is hence not decodable for the wireless device 1.

The wireless device 1 itself has only limited capabilities in terms of extended coverage mode. Hence it has assigned an extended coverage support level (EC) indicating that up to 50 repetitions can be managed for decoding signals from the base node. At a certain point, in particular after powering on the wireless device, it is operated in unregistered state. In that situation according to a preferred exemplifying embodiment of the invention, the following steps are carried out in order to camp on a base node of a cellular network where the wireless device is eligible for operating in.

The shown base nodes 2.1, 2.2, 2.3 of that cellular network are permanently broadcasting their system information blocks (SIBs) 3.1, 3.2, 3.3 whereas, the SIBs from the base nodes 2.1, 2.2 are extended coverage SIBs (EC-SIBs). The wireless device 1 could decode the SIB from base node 2.3, if it is repeated often enough without a change, even if it is not broadcasted in extended coverage. Nevertheless the SIB 3.3 does not indicate the capability of base node 2.3 to support extended coverage mode, hence this base node 2.3 is not taken into account for camping in the following.

As part of the EC-SIBs 3.1, 3.2 broadcasted by the base nodes 2.1, 2.2, it is indicated in a special flag or field the extended coverage maximum support levels ($ECML_{1,2}$) of the base nodes. In this exemplary embodiment the ECML is indicated by the number of repetitions supported by the base node in extended coverage mode.

Base node 2.1 indicates as ECML 60 repetitions, while base node 2.2 indicates 80 repetitions.

Instead of rating at the wireless device 1 the base node's suitability simply by the rule, the more repetitions the better, it is according to the inventive method foreseen to prefer the base node which better matches the wireless device's capabilities for extended coverage.

This is important as many devices may be in the field, that get a software update for supporting extended coverage but the hardware resources does not allow arbitrary amounts of repetitions. Hence it would be a waste of resources if such a wireless device would camp on a base node with much higher capabilities than needed, when at the same time another base node with lower capabilities is in proximity of the wireless device.

Here the wireless device evaluates the received $ECML_{1,2}$ from the base nodes 2.1, 2.2 for the decision to register resp. camp on one of the two base nodes. For that it takes into account the ECML-values and the own extended coverage support level EC. The lower the difference between both values, the more suitable is the respective base node. Hence—in particular provider that the two base nodes do not differ in other suitability criteria—the base node 2.1 is more suitable for the wireless device 1 for operating in extended coverage.

Figure 2:
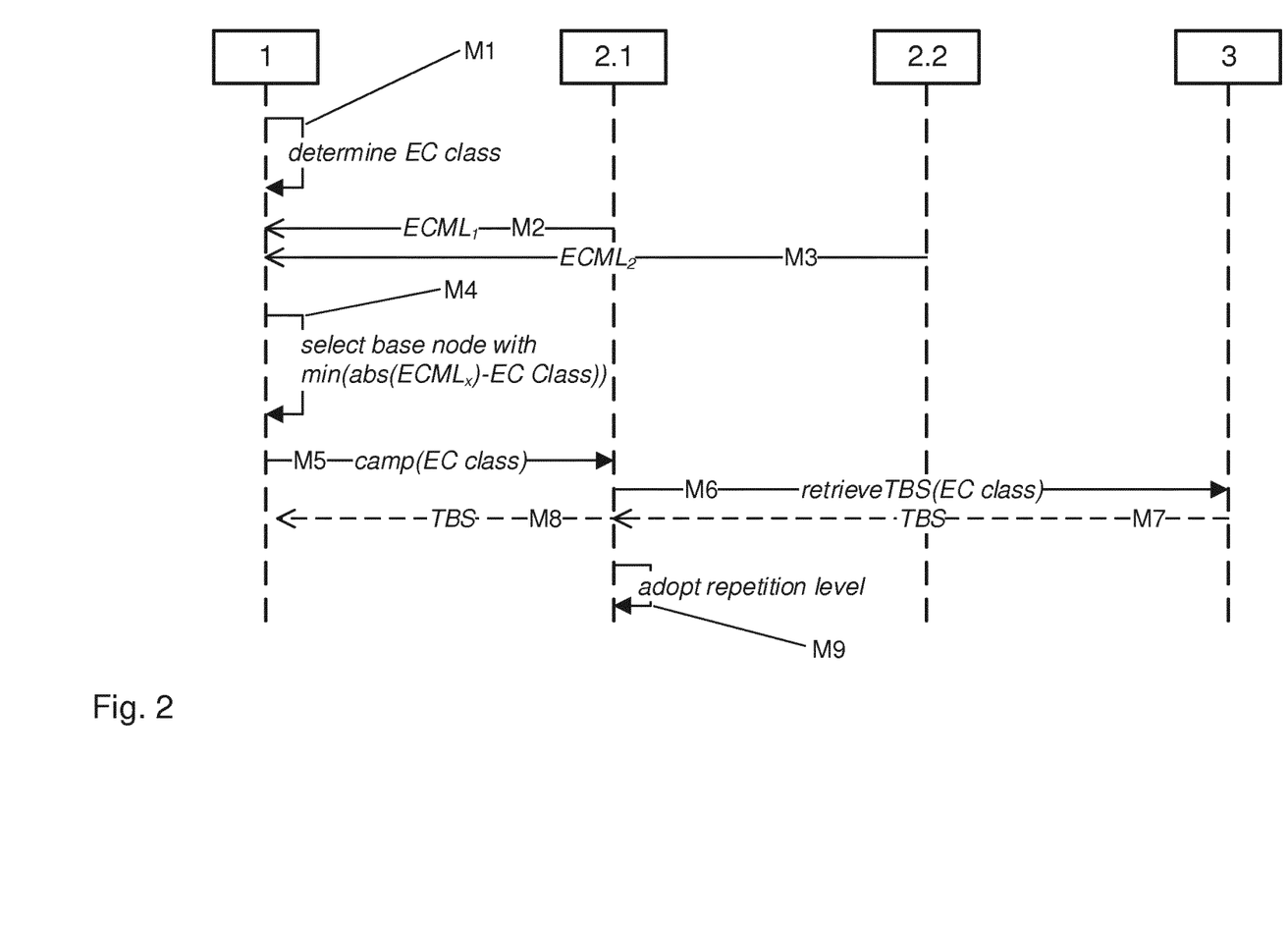
FIG. 2 shows in a sequence diagram a preferred embodiment of the inventive method.

This selection procedure is shown in detail in FIG. 2 which shows in a sequence diagram an advantageous order of operations to carry out the selection of the base nodes according to the inventive method. It can be assumed that the situation of FIG. 1 applies here.

From the perspective of the wireless device 1 there are the two base nodes 2.1 and 2.2, which are decodable and fit for camping.

These base nodes are as part of the cellular network, in particular the radio access network, further connected to a transport coding scheme component 3. This transport coding scheme component is part of the cellular network, in particular part of an already existing component, like the MSC in 2G, the RNC in 3G or the MME in 4G; also SGSN or GSGN could take this task. In the latter sense, the transport coding scheme component 3 is a software application or module running in the respective component of the cellular network.

The wireless device 1 first determines with message step M1 its own extended coverage support level. There are a couple of options foreseen how this determination step is carried out.

As a first option it is done by a manual preconfiguration of the wireless device. As an alternative the extended coverage support level is determined by carrying out a check in the firmware, in particular after update of the firmware. Preferably this check is only carried out once and then the determined extended coverage support level is permanently stored and retrieved upon each powering on.

Alternatively the extended coverage support level is determined by accessing the subscriber identity unit for receiving a value preconfigured from the network operator, in particular covering a certain tariff which includes this limitation. In the following the wireless device 1 listens to the EC-SIBs from the base nodes 2.1 and 2.2. This is typically anyhow carried out in the preparation of registering in the cellular network.

As part of the broadcasted EC-SIBs each base node sends with the message M2 resp. M3 the extended coverage maximum support level $ECML_1$, $ECML_2$. These ECMLs are retrieved at the wireless device 1 and compared with the extended coverage support level of the wireless device.

The extended coverage support level is applied to this exemplary embodiment by way of a class, depicting ranges of supported repetitions of the device. This class is in the following the EC class.

In message step M4 it is carried out the selection of the base nodes from those who transmitted their ECML. As part of the selection it is figured out which base node fits best to the wireless device 1.

In this exemplifying embodiment the best match is determined by finding that base node out of the list of candidate base nodes, for that the following condition is true:

$$\min(abs(\text{ECML}x) - EC\ \text{Class}))$$

wherein ECMLx is a member of set {ECML$_1$, ECML$_2$}. The ECML and EC class are interpreted as number of repetitions.

In this example (see FIG. 1) this is base node 2.1. Hence, with message M5 the wireless device camps on base node 2.1, and provides in course of the camping procedure its extended coverage support level EC class to the base node 2.1.

In this particular embodiment the base node 2.1 itself is not capable of handling this EC class, but forwards the request to the transport coding scheme component 3, with message M6, in order to retrieve the applicable uplink transport coding scheme in dependence of the provided EC class of the wireless device.

With message M7 the transport coding scheme component 3 returns the determined uplink transport coding scheme to the base node, which directly hands it over with message M8 to the wireless device 1. Further uplink signalling from the wireless device with the base node 2.1 will take into account the received uplink transport coding scheme.

On side of the base node it is advantageous to carry out another step. Due to the fact that—at least in this example—the wireless device has lower capabilities for extended coverage, as it was indicated by the EC class compared to ECML1, the wireless device needs to adopt its repetition level, which is indicated with message step M9.

Figure 3:
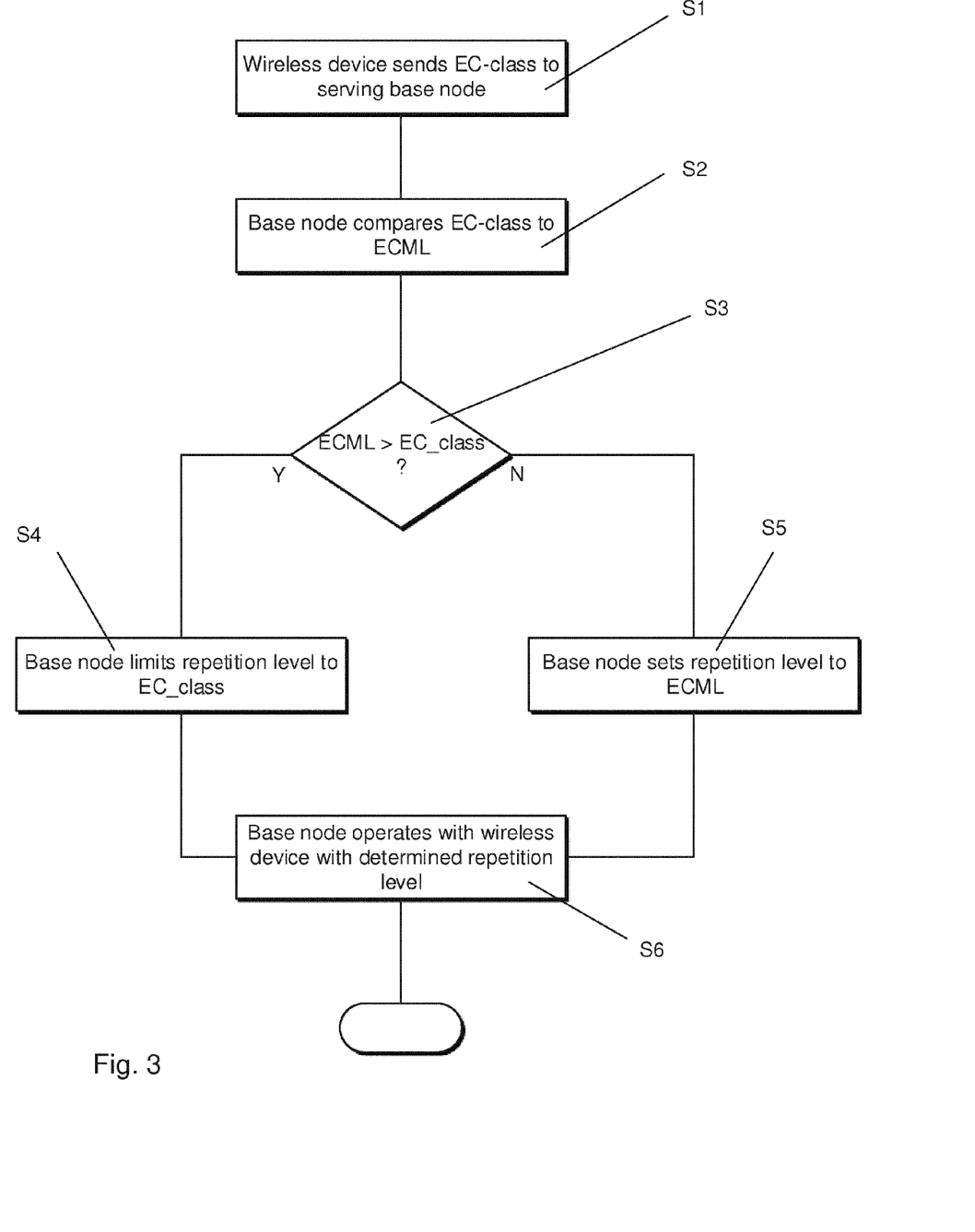
FIG. 3 shows in a flow diagram of another preferred embodiment of the invention.

This step is detailed out in FIG. 3. It starts with step S1 which in particular corresponds to message M5 in FIG. 2. With that the base node 2.1 gets knowledge about the extended coverage support level (EC class) of the wireless device.

In step S2 the base node compares the received EC class with its own ECML. It has in step S3 to make a decision based on the relation if the ECML is larger than the EC class, in particular in terms of repetitions. Should that be true, then the base node would be capable of transmitting in extended coverage mode signals to the wireless device, which are not decodable by the wireless device, due to the limited capabilities.

This in particular applies to paging, when paging requests are sent to a wireless device as a consequence the base node would stop when the maximum accumulation limit, i.e. the wireless device's maximum EC level is met. The base node would no further try to reach the wireless device via paging in case the base node's ECML is larger than the wireless device's EC level. The base node would therefor omit paging for ECML>EC and hence avoid wasting resources.

Hence should this situation apply, the process flow branches to step S4, which leads to a limitation of the repetition level of the base node to the level indicated by the EC class from the wireless device.

Otherwise the repetition level is in step S5 adapted in relation to the ECML of the base node.

Hence, in step S6 the base node operates with the wireless device according to the repetition level determined either in step S4 or S5.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a wireless device, said wireless device communicating with a cellular network by means of a serving base node, being the one of a plurality of base nodes of the cellular network the wireless device is currently camping on, configured to support extended coverage mode, the method comprising for the wireless device the steps of:
   determining an extended coverage support level, relating to the capability of the wireless device for operating in extended coverage mode,
   receiving extended coverage maximum support level broadcasted by a plurality of base nodes,
   selecting one of the plurality of base nodes for registration as serving base node,
   providing upon registration with the selected base node its extended coverage support level towards the base node,
   receiving from the base node a set of uplink transport coding schemes,
   determining the current extended coverage support level for the uplink further based upon conditions local to the wireless device,
   determining at least one uplink transport coding scheme from said received set in dependence on the extended coverage support level for the uplink, and
   transmitting signals in extended coverage to the base node by using the said determined uplink transport coding scheme.

2. Method according to claim 1,
wherein the step of selecting the serving base node from said plurality of base nodes is based on a match between extended coverage support level of the wireless device and extended coverage maximum support level of the base node.

3. Method according to claim 1,
comprising the steps for the cellular network of deriving from information received from the wireless device relating to an extended coverage support level a uplink transport coding scheme of the wireless device,
transmitting said uplink transport coding scheme to the wireless device,
further comprising the step for the wireless device, upon reception of the uplink transport coding scheme from the serving base node, of transmitting signals in extended coverage to the base node by using the received uplink transport coding scheme.

4. Method according to claim 1,
wherein the conditions local to the wireless device comprise at least one out of:

current extended coverage conditions,
uplink signaling capabilities of the wireless device.

5. Wireless device for communicating with a cellular network by means of a serving base node, being one of a plurality of base nodes the wireless device is currently camping on, the wireless device and the serving base node being configured to operate in extended coverage mode,
wherein the wireless device is configured:
to determine an extended coverage support level, relating to the capability of the wireless device for operating in extended coverage mode,
to receive extended coverage maximum support level broadcasted by a plurality of base nodes,
to select one of said plurality of base nodes for registration, and
to provide upon registration with the selected base node its extended coverage support level to the base node,
to receive from the base node a set of uplink transport coding schemes,
to determine conditions local to the wireless device,
to determine the extended coverage support level for the uplink based upon said local conditions,
to determine at least one uplink transport coding scheme from said received set in dependence on the extended coverage support level for the uplink, and
to transmit signals in extended coverage to the base node by using said determined uplink transport coding scheme.

6. Wireless device according to claim 5,
wherein the selection of the serving base node from said plurality of base nodes is based on the match between extended coverage support level of the wireless device and extended coverage maximum support level of the base node.

7. Wireless device according to claim 5,
further comprising a subscriber identity unit,
wherein the subscriber identity unit is configured to store the extended coverage support level of the wireless device,
and the wireless device is configured to determine the extended coverage support level by receiving from the subscriber identity unit on request the stored extended coverage support level.

8. Wireless device according to claim 5,
further configured to receive from the serving base node after providing the extended coverage support level an uplink transport coding scheme, and
in response to transmit signals in extended coverage mode to the serving base node by using the received uplink transport coding scheme.

9. Cellular network comprising at least one network component and a plurality of base nodes, at least one of the base nodes being configured to operate with a wireless device in extended coverage mode,
the network component comprising memory to store an extended coverage support level received from a wireless device operating with a base node of the cellular network,
the network component and the base nodes being configured to exchange information relating to extended coverage support level of at least one wireless device,
further comprising a transport coding scheme component, being accessible at least by the base node, the wireless device is camping on,
the transport coding scheme component further being configured
to derive from information received from the wireless device via the base node relating to an extended coverage support level of the wireless device the uplink transport coding scheme of the wireless device, and
to transmit by means of the base node said derived uplink transport coding scheme to the wireless device.

* * * * *